United States Patent [19]

Fink

[11] Patent Number: 5,348,363
[45] Date of Patent: Sep. 20, 1994

[54] VEHICLE WINDSHIELD BUG AND DEBRIS DEFLECTOR

[75] Inventor: Raymond W. Fink, Elkhart, Ind.

[73] Assignee: Kenco/Williams, Middlebury, Ohio

[21] Appl. No.: 30,583

[22] Filed: Mar. 12, 1993

[51] Int. Cl.$^5$ .............................................. B60J 1/20
[52] U.S. Cl. ................................. 296/91; 296/180.1; 180/69.23
[58] Field of Search .......................... 296/91, 180.1; 180/69.2, 69.21, 69.23

[56] References Cited

U.S. PATENT DOCUMENTS

| | | | |
|---|---|---|---|
| 1,842,607 | 1/1932 | Haushalter | 180/69.23 |
| 2,856,228 | 10/1958 | Adell | 180/69.2 X |
| 2,872,242 | 2/1959 | Whartman et al. | 296/91 |
| 3,022,848 | 2/1962 | Heiser | 180/69.2 |
| 4,052,099 | 10/1977 | Lowery et al. | 296/91 |
| 4,471,991 | 9/1984 | Matthias | 296/91 |
| 4,846,522 | 7/1989 | Bonstead et al. | 296/91 |
| 4,952,006 | 8/1990 | Willey | 180/69.2 X |
| 5,039,156 | 8/1991 | Messmore et al. | 296/91 |
| 5,082,321 | 1/1992 | Brewer | 296/91 |
| 5,094,497 | 3/1992 | Hartung et al. | 296/91 |
| 5,149,169 | 9/1992 | Nozaki | 296/194 X |
| 5,234,247 | 8/1993 | Pacer | 296/91 |

Primary Examiner—David M. Mitchell
Assistant Examiner—Andrew C. Pike
Attorney, Agent, or Firm—Watts, Hoffman, Fisher & Heinke Co.

[57] ABSTRACT

A vehicle windshield bug and debris deflector is mounted on a rearwardly extending flange portion underlying the front portion of a vehicle hood. The deflector, extending substantially the full width of the vehicle hood, comprises a shield having a linear portion, a sharply curved portion, and an upstanding bug deflection portion, at least one attachment strip, and at least one resiliently deformable stabilizer. The attachment strip, having adhesive on both top and bottom surfaces, attaches the upper surface of the linear portion of the shield to the rearwardly extending flange portion underlying the front portion of the vehicle hood. The stabilizer, having adhesive on one surface, attaches to the lower surface of the linear portion of the shield. When the hood is closed, the stabilizer is compressed between the lower surface of the linear portion of the shield and an upper surface of the vehicle grille, thereby reinforcing the attachment of the upper surface of the linear portion of the shield to the attachment strip and the attachment of the attachment strip to the rearwardly extending flange portion underlying the front portion of the vehicle hood.

10 Claims, 2 Drawing Sheets

VEHICLE WINDSHIELD BUG AND DEBRIS DEFLECTOR

FIELD OF THE INVENTION

This invention relates to vehicle windshield bug and debris deflectors and more particularly to deflectors of the type which are mounted on the forwardly extending portions of vehicle hoods.

BACKGROUND OF THE INVENTION

Hood mounted vehicle windshield bug and debris deflectors are generally mounted on the hood by drilling holes near the front of the hood or in a rearwardly extending flange portion at the front of a hood and fastening deflector mounting brackets to the hood or the rearwardly extending flange portion underlying the front portion of the hood using screws or bolts. Before drilling, extreme care must be taken to properly mark the position of the holes to be drilled in the hood so that the holes will be in alignment with the mounting bracket apertures and so that the mounted deflector will have proper orientation relation to the hood.

A windshield bug and debris deflector attached to a vehicle hood in the described manner has numerous disadvantages: (1) it requires painstaking positioning and measurement before drilling holes in the hood to insure proper alignment of the holes and the mounting brackets; (2) it requires the use of various power and hand tools for drilling the holes and attaching the mounting brackets to the hood; (3) the drilled holes permanently damage the hood of the vehicle and may reduce the resale value of the vehicle should the potential purchaser not want a deflector or if the potential purchaser has an affinity for a different style of deflector; (4) it exposes unprotected metal on the perimeter of the drill holes to the atmosphere thereby providing a starting point for rust and may void the vehicle manufacturer's corrosion warranty; (5) the deflector mounting brackets transfer the wind resistance forces experienced by the deflector on a moving vehicle into a torquing action on the hood thereby creating stresses on portions of the hood that the hood was not designed to accommodate; and (6) the wind resistance forces on the moving deflector tends to lift the hood upward from its closed position thus placing additional strain on the hood latching system and aggravating any hood rattling associated with a loose fit between the hood and the hood latching system.

SUMMARY OF THE INVENTION

The primary object of this invention is provide a hood mounted, high strength vehicle windshield bug and debris deflector that is easily and securely fastened to a vehicle hood without the necessity of drilling holes in the hood or otherwise marring the hood or grille finish. Another object of this invention is to provide a windshield bug and debris deflector that has sufficient flexibility along its longitudinal axis to allow it to be mounted on vehicles having slightly arcuate forward hood edges. Still another object of this invention is to reduce and/or eliminate any hood rattling that results from a loose fit between the hood and the hood latching system.

Broadly, the invention includes a shield, which serves to deflect bugs and debris from impacting the windshield of vehicle. At least one attachment strip attaches the bottom portion of the shield to the rearwardly extending flange portion at the front of the hood. At least one stabilizer is provided, which attaches to the bottom portion of the shield. When the hood is closed, the stabilizer is compressed between the bottom portion of the shield and the top of the vehicle grille. The stabilizer serves to reinforce the attachment of the bottom portion of the shield to the attachment strip and the attachment of the attachment strip to the rearwardly extending flange portion at the front of the hood. In addition, the compression of the stabilizer serves to reduce or eliminate hood rattle associated with a loose fit between the hood and the hood latching system.

DESCRIPTION OF THE PREFERRED EMBODIMENTS

Figure 1:
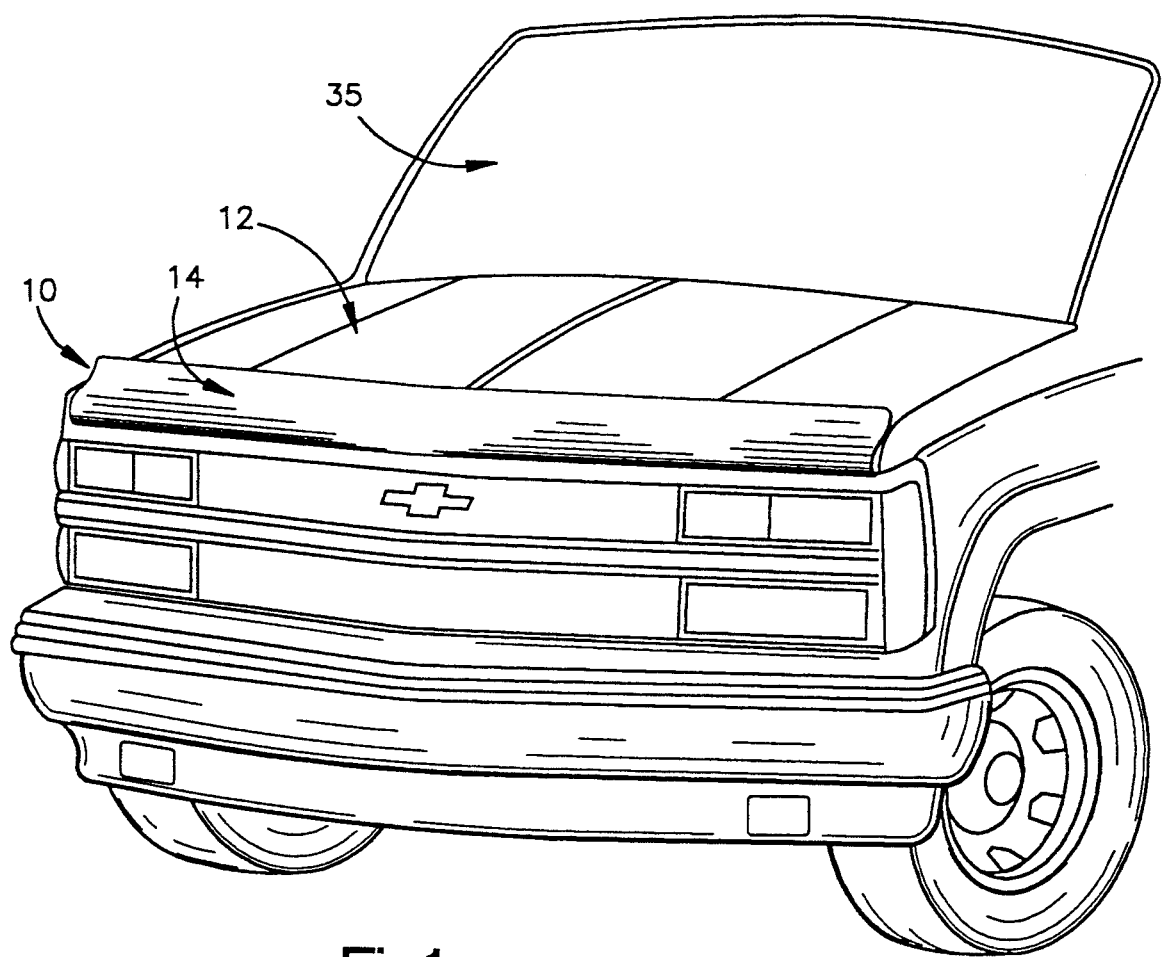
FIG. 1 is a perspective view of a windshield bug and debris deflector constructed in accordance with the present invention mounted on the rearwardly extending flange portion at the front of the hood of a pick up truck.

FIG. 1 illustrates the vehicle windshield bug and debris deflector shown generally at 10 mounted on the front of a vehicle hood 12. The structure of the attachment of the deflector 10 to the hood 12 is shown in cross section in FIG. 2. The shield 14 is preferably constructed of high impact polycarbonate plastic. The shield 14 is comprised of a linear mounting portion 16, a laterally extending, semicircular or sharply curved section 18, and a longer section 20 that is a slightly curved S-shape. An attachment strip 22 is adhesively affixed to upper surface 24 of the shield's linear portion 16. The attachment strip 22 is preferably double faced pressure sensitive adhesive tape and has a thickness of approximately 60 mils. In use, the opposite side of attachment strip 22 is adhesively affixed to rearwardly extending flange portion 26 underlying the hood×s front portion 28.

A stabilizer 30 has adhesive on one surface that is affixed to a lower surface 32 of the shield's linear portion 16. The stabilizer 30 is comprised of a resiliently deformable material. When the hood is closed, the stabilizer 30 is compressed between the lower surface 32 of the shield's linear portion 16 and an upper surface of a grille 34. The compressed stabilizer 30 puts upward pressure on the lower surface 32 of the shield's linear portion 16 thereby reinforcing the attachment between the upper surface 24 and the attachment strip 22 and the attachment between the attachment strip 22 and the hood's rearwardly extending flange portion 26. Additionally, the compression of the stabilizer 30 provides a damping shock absorber effect that reduces or eliminates any hood rattle that might otherwise be present due to a loose fit between the hood and the hood latching system (not shown).

The shield's sharply curved portion 18 provides the necessary clearance of the shield from the forward edge 28 of the hood. The shield's slightly curved section 20 extends vertically, somewhat past the horizontal level of the hood 12 and serves to deflect bugs and road debris from impacting the windshield 35 as the vehicle is moving.

The length and number of attachment strips and length, number, and cross-sectional shape of the stabilizers will vary depending on the width of the vehicle hood and the configuration of the hood's rearwardly extending flange portion. The shield has sufficient flexibility along its longitudinal axis to permit the deflector to be mounted on vehicles having a hood with a forwardly extending edge that is slightly arcuate.

Figure 2:
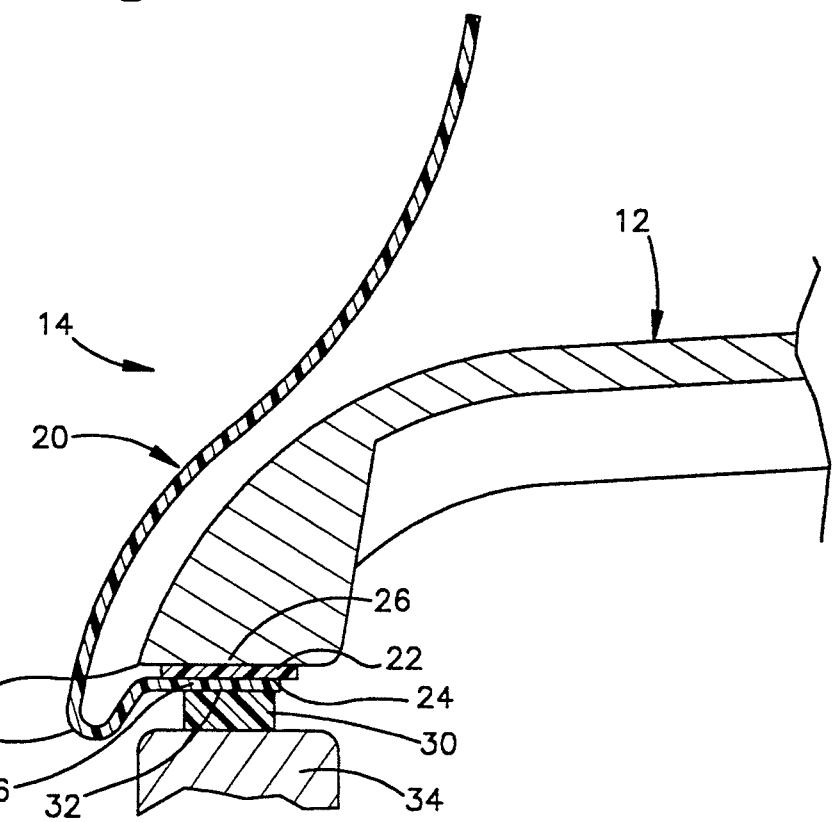
FIG. 2 is a sectional view of the windshield bug and debris deflector shown in FIG. 1.
Figure 3:
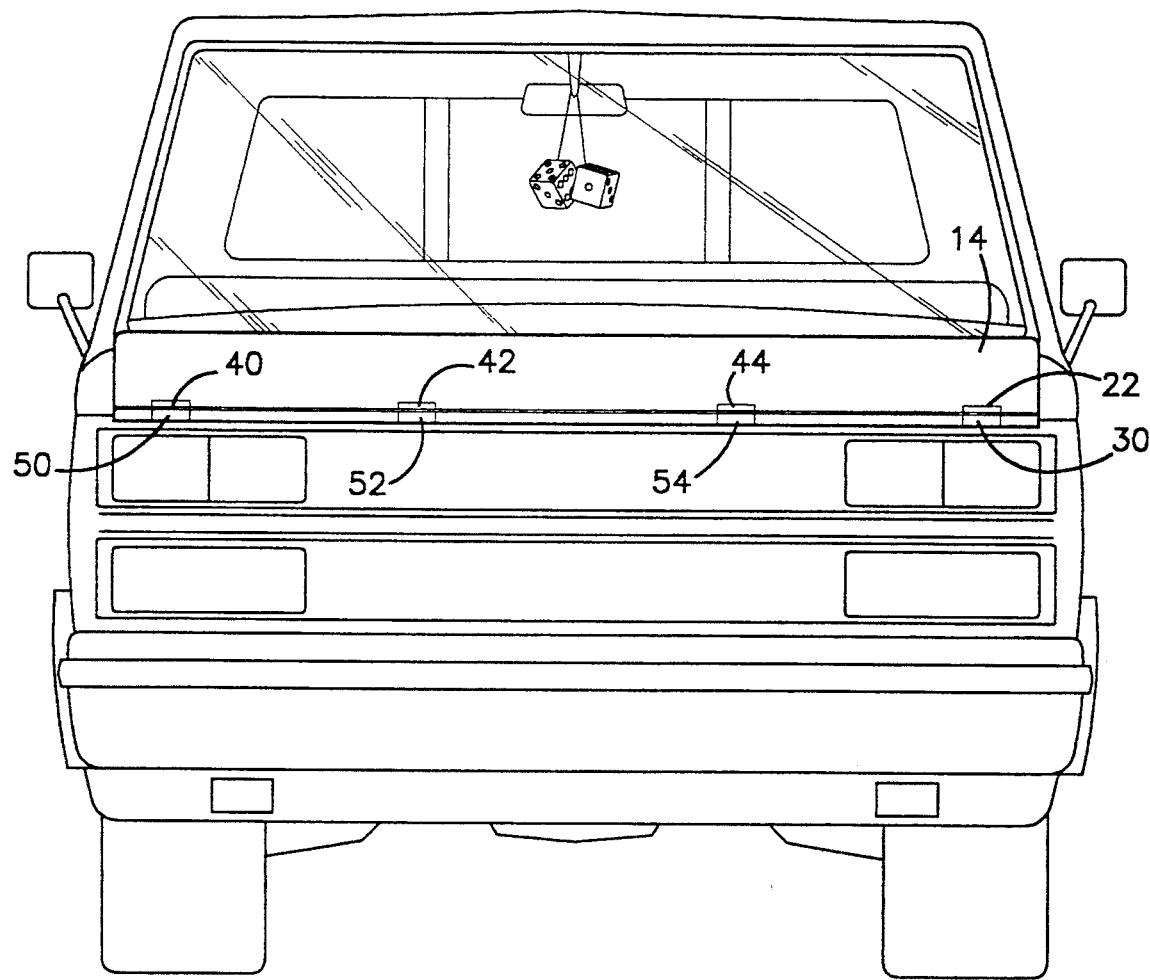
FIG. 3 is an enlarged front elevational view of the windshield and debris deflector mounted on the pick up truck shown in FIG. 1; and, FIG. 4 is a sectional view of the windshield bug and debris deflector mounted on the rearwardly extending flange portion at the front of the hood of a vehicle whose rearwardly extending flange portion at the front of the hood is not parallel to the horizontal axis.

The vehicle illustrated in FIGS. 1-3 is a Chevrolet S-10 pick-up truck. For this vehicle, four attachment strips 22, 40, 42, 44 are used, each strip having a length of approximately four inches and the strips being spaced generally equidistant across the width of the shield 14. A similar number of two inch long stabilizers are used. Because the hood×s rearwardly extending flange portion 26 is horizontal, the stabilizers 30, 50, 52, 54 are rectangular in cross section having a height of one half inch and a width of one inch. The stabilizers are spaced across the width of the shield 14 so that their horizontal midpoints are aligned with the horizontal midpoints of the attachment strips.

Figure 4:
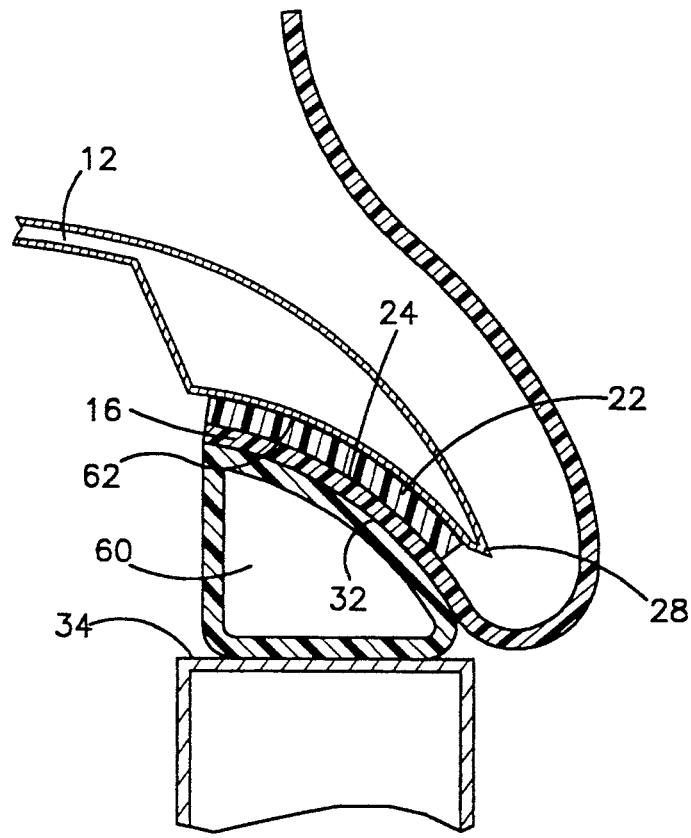

When the hood's rearwardly extending flange portion is not parallel to the horizontal axis as, for example, on certain Ford vehicles, see FIG. 4, a stabilizer 60 with a triangular cross section is used. When the hood 12 is closed, the stabilizer 60 is in compression between the lower surface 32 of the shield's linear portion 16 and an upper surface of a grille 34, thus reinforcing the attachment of the upper surface 24 of the shield's linear portion 16 to the attachment strip 16 and the attachment of the attachment strips to the hood's rearwardly extending flange portion 26. The deflector shield 12, at least one attachment strip 22, and at least one compressible stabilizer 30 comprise a kit for providing a bug and debris deflector for a vehicle.

While the preferred embodiment for practicing the present invention has been described in detail, it will be apparent that various modifications or alterations may be made therein without departing from the spirit and scope of the invention, set forth in the appended claims.

I claim:

1. A vehicle windshield bug and debris deflector for mounting on a vehicle hood comprising:
    a) a shield, which when in use extends substantially the full width of such vehicle hood, the shield having, in cross section, a linear portion, a sharply curved portion, and an upstanding bug deflection portion;
    b) at least one attachment strip, said strip having adhesive means on opposite surfaces, the adhesive means on one of the surfaces for engaging the upper surface of said linear portion of said shield and the adhesive means on the opposed surface for engaging a rearwardly extending flange portion underlying a front portion of such vehicle hood;
    c) at least one resiliently deformable stabilizer, said stabilizer having adhesive means on one surface attaching said stabilizer to the lower surface of said linear portion of said shield.

2. The vehicle windshield bug and debris deflector of claim 1 wherein said shield is comprised of high impact polycarbonate plastic.

3. The vehicle windshield bug and debris deflector of claim 1 wherein said attachment strip is comprised of double faced adhesive tape.

4. In combination, a vehicle including a hood and a windshield bug and debris deflector mounted on a rearwardly extending flange portion underlying a front portion of the hood comprising:
    a) a shield, extending substantially the full width of said vehicle hood, the shield having, in cross section, a linear portion, a sharply curved portion, and an upstanding bug deflection portion;
    b) at least one attachment strip, the strip having adhesive means on the top and bottom surfaces, said attachment strip attaching an upper surface of said linear portion of said shield to said rearwardly extending flange portion underlying said front portion of said hood; and
    c) at least one resiliently deformable stabilizer, having adhesive means on one surface, said adhesive means attaching said stabilizer to a lower surface of said linear portion whereby, when said hood is closed, said stabilizeer is compressed between the lower surface of said linear portion of said shield and an upper surface of a vehicle grille.

5. The vehicle windshield bug and debris deflector of claim 4 wherein said shield is comprised of high impact polycarbonate plastic.

6. The vehicle windshield bug and debris deflector of claim 4 wherein said attachment strip is comprised of double faced adhesive tape.

7. A method for attaching a windshield bug and debris deflector having a shield extending substantially the full width of a vehicle hood and having, in cross section, a linear portion, a sharply curved portion, and an upstanding bug deflection portion to a rearwardly extending flange portion underlying a front portion of such a vehicle hood comprising:
    a) adhesively affixing at least one attachment strip to an upper surface of said linear portion of said deflector shield;
    b) affixing at least one resiliently deformable stabilizer to a lower surface of said linear portion of said deflector shield;
    c) opening and slightly raising said hood of said vehicle;
    d) centering the midpoint of said deflector shield with the centerline of said hood;
    e) positioning said deflector shield such that said upstanding bug deflection portion of said deflector shield clears said front portion of said hood and such that said attachment strip of said deflector shield contacts said rearwardly extending flange portion underlying said front portion of said hood; and
    f) providing pressure on said deflector shield to secure the attachment of said attachment strip to said rearwardly extending flange portion with a pressure sensitive adhesive.

8. A kit for providing a bug and debris deflector for a vehicle by attachment to a rearwardly extending flange portion underlying a front portion of vehicle's hood, comprising:
    a) a shield including an elongate deflector portion adapted to extend laterally across a substantial portion of such hood in slightly space upstanding relationship;

at least one linear portion for attachment to such hood flange portion and at least one curved portion interconnecting the deflector and linear portions to support the deflector portion in upstanding relationship when the deflector is in use;

b) at least one attachment strip having pressure sensitive adhesive on each of two opposite surfaces for attaching said at least one linear portion to such hood flange portion; and c) at least one compressor having pressure sensitive adhesive on one surface thereof for attachment to a selected one of the linear portion and a grill of such vehicle for compressive positioning between the linear portion and such grille when the deflector is in use on such vehicle with such hood being closed.

9. The deflector kit of claim 8 wherein there are a like number of the at least one attachment strip, the at least one compressor and the at least one linear portion.

10. The deflector kit of claim 8 wherein there are a like number of the at least one linear portion and the at least one curved portion.

* * * * *